US007862434B2

(12) United States Patent
Miller et al.

(10) Patent No.: US 7,862,434 B2

(45) Date of Patent: Jan. 4, 2011

(54) MULTI-SENSOR SYSTEM FOR COUNTING AND IDENTIFYING OBJECTS IN CLOSE PROXIMITY

(75) Inventors: Ronald N. Miller, Toronto (CA); Christian Richard, Dorval (CA); Iannick Poirier, St-Philippe (CA)

(73) Assignee: The Kendall 1987 Revocable Trust, Bonita Springs, FL (US)

( * ) Notice: Subject to any disclaimer, the term of this patent is extended or adjusted under 35 U.S.C. 154(b) by 698 days.

(21) Appl. No.: 11/672,301

(22) Filed: Feb. 7, 2007

(65) Prior Publication Data

US 2007/0184898 A1 Aug. 9, 2007

Related U.S. Application Data

(60) Provisional application No. 60/765,727, filed on Feb. 7, 2006.

(51) Int. Cl.
*A63F 13/00* (2006.01)

(52) U.S. Cl. .......................................... 463/43; 463/29

(58) Field of Classification Search ................... 463/29, 463/40, 42, 43, 47; 705/28
See application file for complete search history.

(56) References Cited

U.S. PATENT DOCUMENTS 6,460,848 B1 * 10/2002 Soltys et al. ............ 273/149 R
7,316,615 B2 * 1/2008 Soltys et al. .................. 463/25
2004/0087375 A1 * 5/2004 Gelinotte ..................... 463/47
2004/0100363 A1 5/2004 Lane et al.
2005/0024211 A1 2/2005 Maloney
2005/0040934 A1 * 2/2005 Shanton ..................... 340/5.92
2006/0012473 A1 1/2006 Bishop et al.
2007/0026949 A1 * 2/2007 Charlier et al. ............... 463/47
2007/0060307 A1 * 3/2007 Mathis et al. ................. 463/25
2007/0102654 A1 * 5/2007 Schoo ........................ 250/576
2008/0210757 A1 * 9/2008 Burden et al. ............... 235/449

* cited by examiner

*Primary Examiner*—James S McClellan
(74) *Attorney, Agent, or Firm*—Pierce Atwood LLP; Kevin M. Farrell; Katherine A. Wrobel

(57) ABSTRACT

A system for counting and identifying a plurality of gaming chips having a programmable RFID device embedded therein. The programmable RFID device having unique authentication data disposed therein. The system includes a tray structure defining a plurality of predetermined chip positions within a multi-dimensional grid. The tray structure is configured to carry the plurality of gaming chips such that each of the plurality of gaming chips are substantially disposed in a corresponding one of the plurality of predetermined chip positions within the multi-dimensional grid. An optical sensing assembly is configured to optically scan each of the plurality of predetermined chip positions to detect the presence of a gaming chip in each of the plurality of predetermined chip positions if present therein and generate a count corresponding to a number of detected gaming chips. An RFID reader assembly is configured to interrogate the plurality of gaming chips disposed in the tray structure and generate a list of authenticated gaming chips, the RFID reader assembly further generating a system status based on a comparison of the list of authenticated gaming chips relative to the number of detected gaming chips counted by the optical sensing assembly.

41 Claims, 8 Drawing Sheets

MULTI-SENSOR SYSTEM FOR COUNTING AND IDENTIFYING OBJECTS IN CLOSE PROXIMITY

CROSS-REFERENCE TO RELATED APPLICATIONS

This patent application claims priority to U.S. Provisional Patent Application Ser. No. 60/765,727 filed on Feb. 7, 2006, the content of which is relied upon and incorporated herein by reference in its entirety, and the benefit of priority under 35 U.S.C. §119(e) is hereby claimed.

BACKGROUND OF THE INVENTION

1. Field of the Invention

The present invention relates generally to multi-sensor systems, and particularly to multi-sensor systems for counting and identifying objects in close proximity.

2. Technical Background

In a typical casino environment, gaming chips are initially loaded in a secure area such as a vault. The gaming chips are subsequently transferred in trays to an area commonly referred to as the "Pit." The trays are then transferred to the gaming tables as needed in accordance with the course of business. Along each step there is a need for the casino personnel to count the chips on the tray, determine the value of the tray and take responsibility for the tray. The dollar value that a complete tray represents can be quite high.

When managing their trays, dealers usually place chips of the same color in a given column to simplify accounting. Chips are separated into groups comprising, for example, 20 chips, the groups being separated by spacers called "lammers." The lammers allow casino personnel to quickly and easily count the number of chips in a column. For example, a sixty (60) chip column, of course, would include three groups of twenty (20) chips, with each group being separated by a lammer. A column may be include 50 to 60 chips. If a column is not completely filled, the remaining chips in the last group (less than 20) will usually not be terminated by a lammer.

Assuming for the sake of example that there are twelve (12) columns of gaming chips in a tray, a single tray may be valued in the tens of thousands of dollars. Accordingly, chip security and chip authentication is a significant issue for casino management. Because manual efforts to improve security and authentication have historically provide to be inadequate, casino managers are increasingly turning to automated technology based solutions.

In one approach, system designers are considering the use of electronic identification devices disposed in the gaming chip itself. By using embedded technology such as this, casino managers are hoping to reduce the incidence of counterfeiting, improve chip security and authentication, improve its operations in handling, tracking and accounting for chips, monitor dealer performance and gaming table efficiencies, and offer players additional services.

Gaming chips using embedded RFID devices seem to offer much promise in realizing a serviceable gaming chip having an electronic device embedded therein. For example, an UHF RFID system of this type is introduced in U.S. Pat. No. 5,651,458. However, the system in the '458 patent is not enabled because the patentee fails to show how a 915 MHz system may be implemented in a gaming chip. In fact, the only disclosure is directed to a system known as "Supertag." At minimum, the Supertag 915 MHz antenna requires a minimum footprint greater than approximately 3-4 inches. To further drive the point home, no one has been able to successfully make and/or use an operable gaming chip and system at the 915 MHz frequency to date.

On the other hand, some are considering the use of gaming chips having inductively coupled high frequency HF RFID devices operating at 13.56 MHz in accordance with ISO 15693 standards. These so-called HF RFID devices would be programmed to include a unique ID number, an authentication code, casino-specific data and a monetary value which may be set when issued by the Casino.

Unfortunately, some of the HF RFID devices under consideration also experience drawbacks. For example, conventional high frequency technology does not guarantee a 100% error free tracking. Most of the errors being of the "false negative" type. i.e., a failure to detect a chip that is present. As noted above, HF RFID systems employ magnetic field coupling to track the embedded devices. Chips having inductively coupled devices may be susceptible to de-tuning when in close proximity with other chips of the same type. Accordingly, conventional techniques do not perform well when the chips are stacked or disposed in trays. Furthermore, the simple single loop couplers used in most HF RFID installations produce fields that have "holes" or "nulls" where there is insufficient signal to properly energize and read all of the chips.

Other types of sensors have been proposed for counting chips in the tray. In one approach, a photocell sensor has been disposed under each chip position. In another approach, an ultrasonic sensor was provided for each column of chips. Alternatively, an ultrasonic sensor is provided for each column of chips and a color sensor is provided for the first chip of each column. Unfortunately, none of the aforementioned approaches have been particularly successful.

What is needed, therefore, is a multi-sensor system for counting and identifying either stacked chips or a group of chips arranged in a tray.

SUMMARY OF THE INVENTION

The present invention addresses the needs described above by providing a multi-sensor system for counting and identifying either stacked chips or a group of chips arranged in a tray. The system of the present invention includes an HF RFID sensor configured to generate a "read list" comprising all of the chips identified by the HF RFID reader. A second complimentary optical sensor is configured to count or detect the chips in the tray. The chip count may be compared to the total size of the read HF RFID list to ensure accuracy. If there is a discrepancy, the process is repeated automatically. If the discrepancy persists, the operator and/or casino management is/are alerted.

One aspect of the present invention is directed to a system for counting and identifying a plurality of gaming chips having a programmable RFID device embedded therein. The programmable RFID device having unique authentication data disposed therein. The system includes a tray structure defining a plurality of predetermined chip positions within a multi-dimensional grid. The tray structure is configured to carry the plurality of gaming chips such that each of the plurality of gaming chips are substantially disposed in a corresponding one of the plurality of predetermined chip positions within the multi-dimensional grid. An optical sensing assembly is configured to optically scan each of the plurality of predetermined chip positions to detect the presence of a gaming chip in each of the plurality of predetermined chip positions if present therein and generate a count corresponding to a number of detected gaming chips. An RFID reader assembly is configured to interrogate the plurality of gaming chips disposed in the tray structure and generate a list of authenticated gaming chips, the RFID reader assembly further generating a system status based on a comparison of the list of authenticated gaming chips relative to the number of detected gaming chips counted by the optical sensing assembly.

In another aspect, the present invention is directed to a system for identifying a plurality of objects in close proximity. Each of the plurality of objects has a programmable RFID device embedded therein. The programmable RFID device includes unique authentication data disposed therein. The system includes a structure that defines a plurality of predetermined spatial positions. The structure is configured to support the plurality of objects. Each of the plurality of objects are disposed in corresponding one of the plurality of predetermined spatial positions. An optical sensing assembly is configured to optically scan each of the plurality of predetermined spatial positions to thereby detect the presence of an object in each of the plurality of predetermined spatial positions if present therein, and generate a list of optically detected objects. An RFID reader assembly is configured to interrogate the plurality of objects disposed in the structure and generate a list of authenticated objects. The RFID reader assembly further generating a system status based on a comparison of the list and count of authenticated objects relative to the number of detected objects counted by the optical sensing assembly.

In yet another aspect, the present invention is directed to a system for counting and identifying a plurality of gaming chips having a programmable RFID device embedded therein. The programmable RFID device having unique authentication data disposed therein. The system includes a tray structure defining a plurality of predetermined chip positions within a multi-dimensional grid. The tray structure is configured to carry the plurality of gaming chips such that each of the plurality of gaming chips are substantially disposed in a corresponding one of the plurality of predetermined chip positions within the multi-dimensional grid. The plurality of gaming chips include American style gaming chips, European style jetons, and/or rectangular European style plaques. An optical sensing assembly is configured to optically scan each of the plurality of predetermined chip positions to detect the presence of a gaming chip in each of the plurality of predetermined chip positions if present therein and generate a count corresponding to a number of detected gaming chips. An RFID reader assembly is configured to interrogate the plurality of gaming chips disposed in the tray structure and generate a list of authenticated gaming chips, the RFID reader assembly further generating a system status based on a comparison of the list of authenticated gaming chips relative to the number of detected gaming chips counted by the optical sensing assembly.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
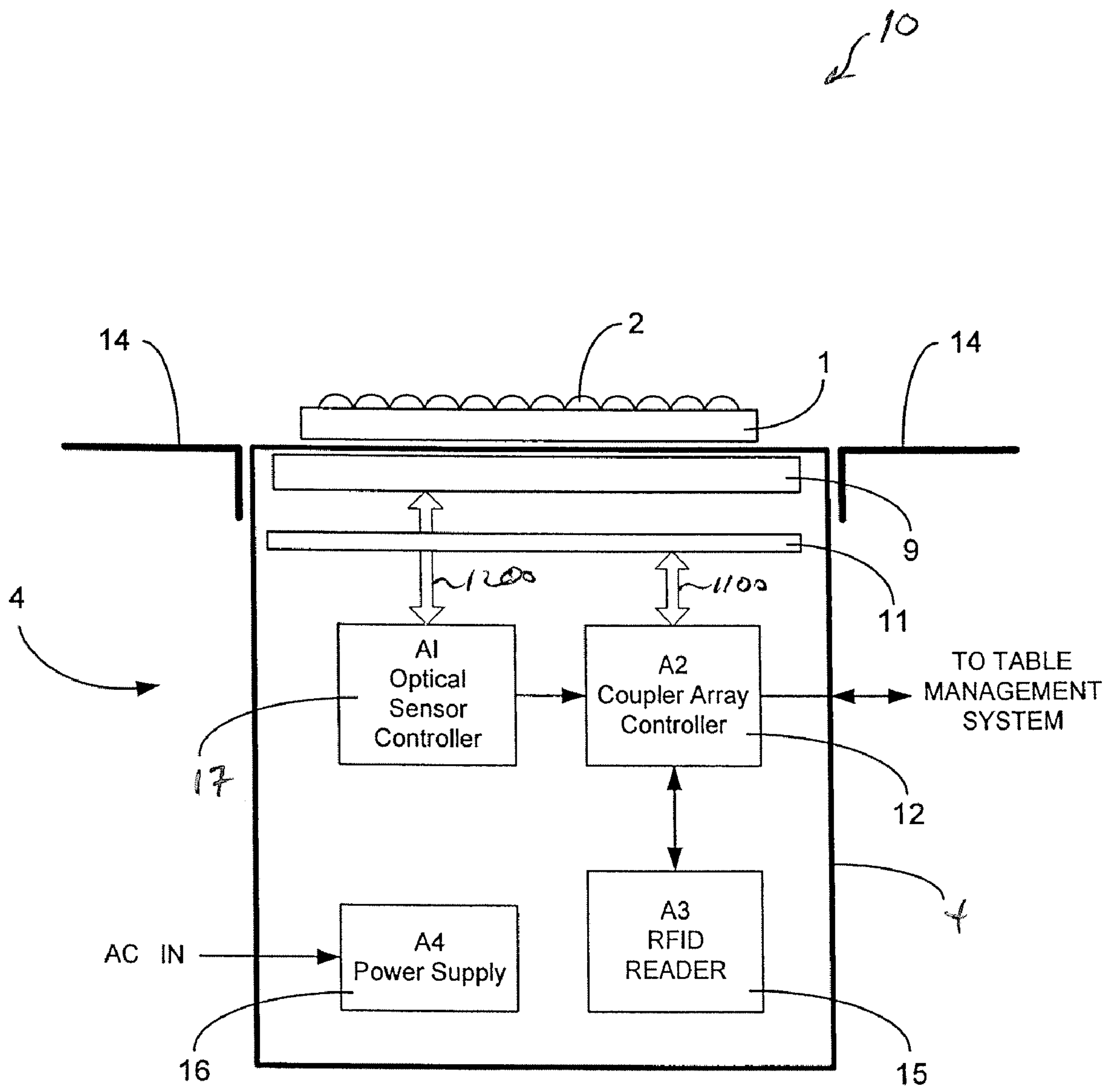
FIG. 1 is a block diagram of a sensor cradle.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the multi-sensor system 10 of the present invention is shown in FIG. 1, and is designated generally throughout by reference numeral 10.

In accordance with the invention, the present invention is directed to an Intelligent Tray System 10 configured to provide an accurate real-time count of the value of all gaming chips in a tray on a gaming table. The system also reduces the manual labor required for the accounting of tray totals at the vault, pit and table. Furthermore, the system 10 provides early detection of counterfeit chips, i.e. chips not having a HFID, or chips from other casinos. Furthermore, the system 10 is configured to detect and warn of chips which are disposed in non-ideal orientations.

As embodied herein, and depicted in FIG. 1, a block diagram of a multi-sensor system 10 is disclosed in accordance with the present invention. System 10 is housed in a sensor cradle 4 which is disposed in a gaming table surface 14 under a chip tray 1. The chip tray 1 includes a plurality of embedded HFID gaming chips disposed therein. System 10 includes the HFID sensor sub-system that operates in conjunction with an optical sensor sub-system. The HFID sub-system includes an HFID coupler board 11 disposed in close proximity to the underside of the gaming table 14. HFID coupler board 11 includes HFID loops and switches and is coupled to an HFID coupler array controller 12 via bus system 1100. The coupler array controller 12 includes a microprocessor and high frequency (HF) switches to route the signals to the HFID reader 15. The microprocessor also acts as the "Host" computer for System 10 and is responsible for communicating with the Casino's Gaming Table Management System. It queries the database for chip data and value in the authentication process and sends a variety of serial date messages such as status messages and tray total values at a requested rate or autonomously on a change. The sensor cradle 4 also houses an optical array controller 9. The optical array controller is coupled to sensor controller board 13 by way of bus 1200. The optical sensor controller 13 is coupled to the coupler array controller 12.

The system 10 also includes a power supply system 16 disposed in sensor cradle housing 4. The power supply conveniently converts AC power into the various voltages required by the previously disclosed units disposed in cradle housing 4. Accordingly, a location appropriate power plug and cord assembly are connected to the power supply and configured to be inserted into a receptacle outlet to obtain AC power. Once power is applied to system 10, the processors disposed in controller 12 and controller 13 perform initialization and handshaking routines to ensure that they are both communicating with each other as well as with the Table Management system.

In another embodiment, the optical array 9 and sensor controller 13 are implemented on a single circuit board strip containing a microcontroller, photo detector receiver amplifier, filter, and addressing logic. Each board in this embodiment is responsible for scanning and reporting the chip count for one strip (tray column). The Sensor Controllers send their data to the Coupler Array Controller via a serial data link. A complete tray is optically scanned in under 0.5 seconds allowing a continuously running rate of 2 updates/second.

The Coupler Array controller 12 interfaces with the RFID Reader, selects the inductive coupling pick-up loops to use, consolidates the "RFID inventory" obtained from the Reader 15 and justifies it against the physical count obtained from the Optical sensors. Tray contents and warnings are then formatted into serial data messages communicated to a higher level Casino Management system via a dedicated communication channel. The HF RFID reader may be implemented using any suitable device, for example, a reader such as the Feig LR 200 may be employed.

To speed the tray inventory update rate, the RFID loops may be adaptively selected for HF RFID scanning based on when the optical scanners detect that the chip count has changed, or that the chip count indicates that the tray 1 is virtually empty such that only the top side RFID loops need be read.

A version of the tray can include various status LED indicator lights to alert dealers or casino personnel of operating status, detection of one or more counterfeit chips, or a misplaced chip. Note that since the optical diodes use infrared, tray operation is not visible and levels are extremely low so that eye safety is not an issue.

Figure 2A:
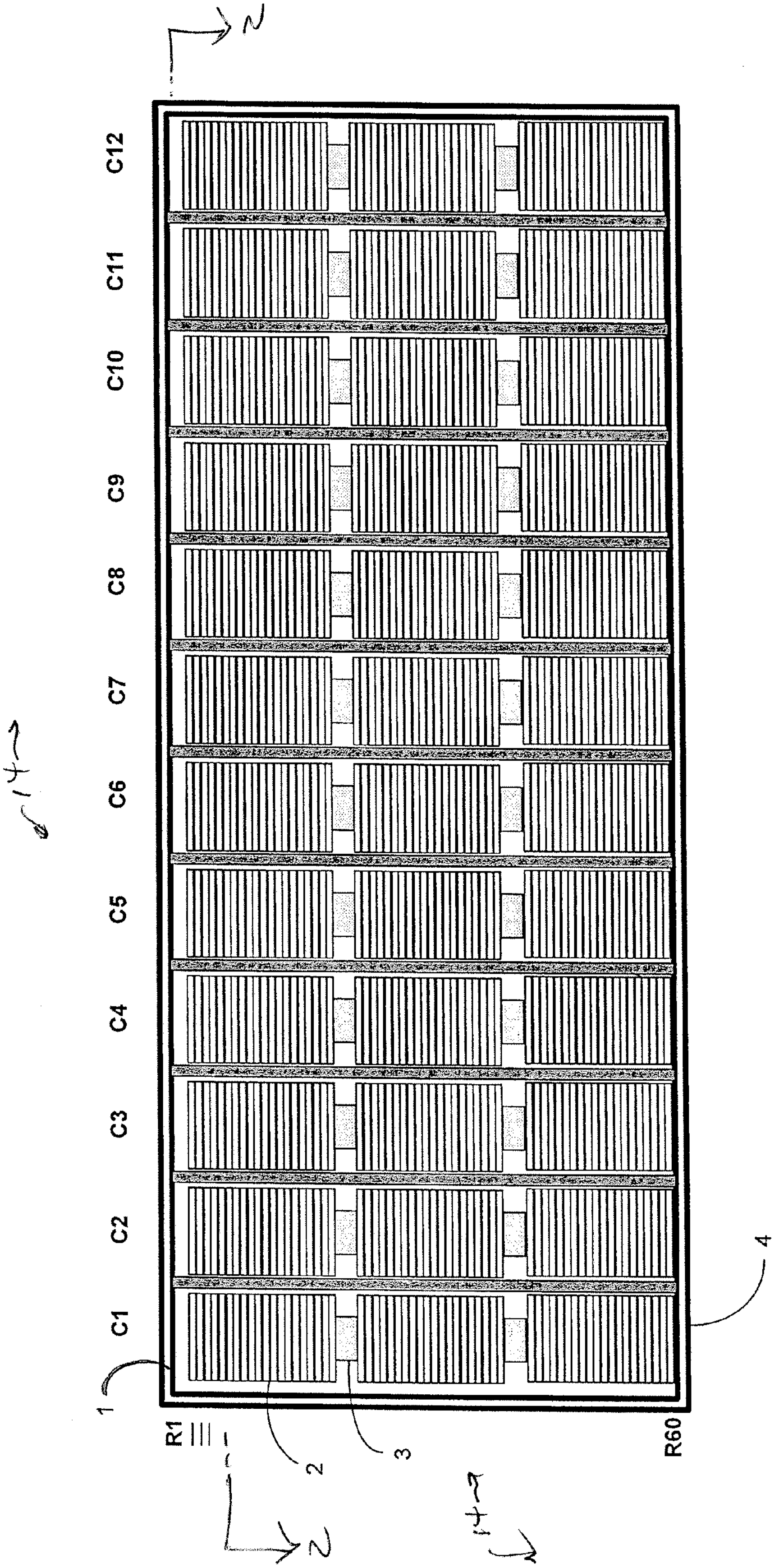
FIG. 2A is a top view of a chip tray.

Referring to FIG. 2A, a plan view of the chip tray 1 depicted in FIG. 1 is disclosed. Chip tray 1 is disposed on cradle housing 4 within gaming table surface 14. Tray 1 includes twelve columns (C1-C12) of gaming chips 2. IF the tray is filled to capacity, each column includes three groups of twenty chips separated by a lammer 3. From an optical sensing standpoint, those of ordinary skill in the art will understand that each chip position may be identified using a column/row grid. Each column may be thought of as containing sixty (60) rows of chips.

Figure 2B:
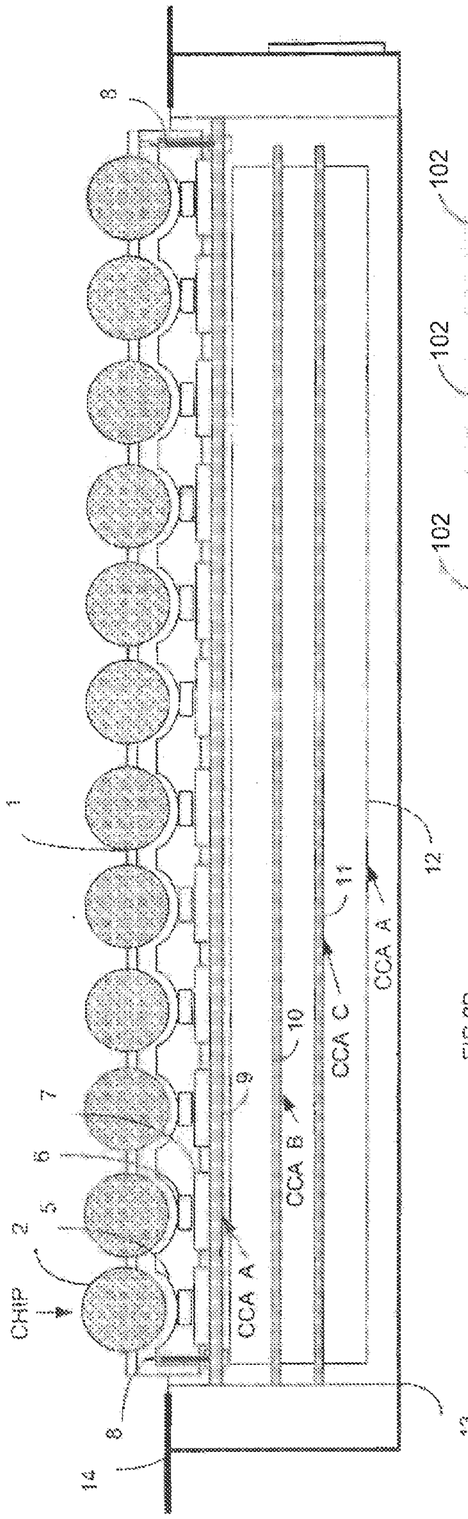
FIG. 2B is a cross section of a chip tray.

Referring to FIG. 2B, a cross sectional view of the chip tray depicted in FIG. 2A is shown. This chip tray is commonly referred to as an "American" chip tray. This view is taken along line 2-2 shown in FIG. 2A and provides a cross-sectional view of the twelve columns C1-C12. As shown, sensor cradle housing 4 is disposed in a pocket 140 formed in the surface of gaming table 14. Tray 1 is similar to standard trays and includes an arcuate portion 5 which, of course, has a form factor that corresponds to the shape of chip 2 such that it fits snugly therein. Tray 1 differs from conventional trays in that it includes an optically clear non-defusing window 6 is disposed under each chip position within the column. Window 6 is in optical communication with a sensor strip 7. Note that the sensor strips 7 are disposed in a two-dimensional horizontal plane to form a sensor grid for optically determining the position of each gaming chip disposed in tray 1. The sensor strips 7 provide an optical input to optical array controller 9, which is physically implemented on circuit card assembly A. Circuit card assembly A is fastened to tray 1 by connector elements 8. It should also be noted that the position of tray 1 relative to the horizontal plane may be adjusted to ensure that window 6 is properly aligned to the bottom of arcuate portion 5. In other words, a radial taken from the center origin of a given chip 2 and extending to the center of window 6 should be substantially normal to the horizontal plane.

Sensor cradle 4 is also shown to include card slots that accommodate optical sensor controller 10 (disposed on circuit card assembly B), HF RFID coupler board 11 (disposed on circuit card assembly C), and coupler array controller 12. Of course, sensor cradle 4 also includes a region that accommodates HF RFID reader 15 as well as power supply 16. However, as the reader will appreciate, these devices are not intersection by sectional line 2-2, and therefore, are not seen in this view.

Figure 2C:
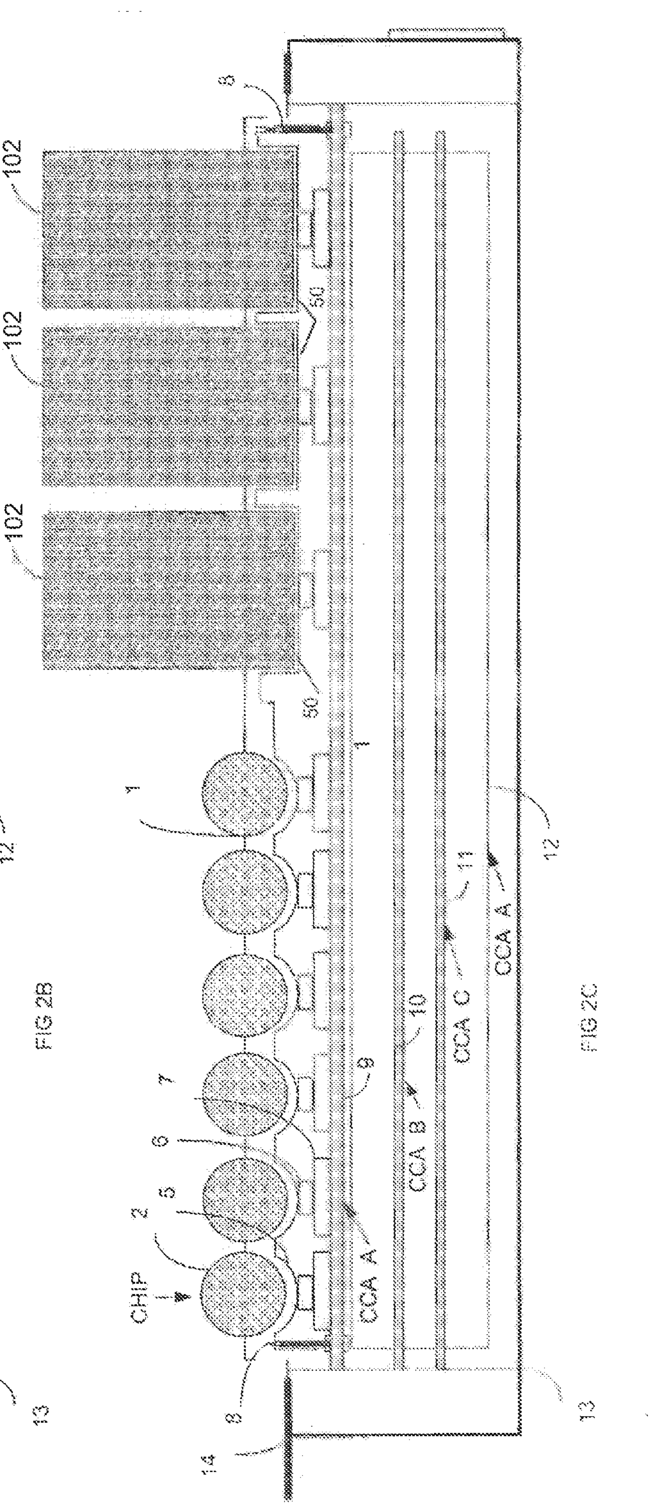
FIG. 2C is a cross section of a tray designed to hold both jetons (chips) and plaques.

Referring to FIG. 2C, a cross sectional view of an alternate embodiment of the present invention is disclosed. This embodiment illustrates a "European" style tray 1 that accommodates both gaming chips 2 and jetons/plaques 102. Those of ordinary skill in the art will appreciate that the only difference between the embodiment shown in FIGS. 2A and 2B is the layout of the sensor grid. Obviously, this is predicated on the form factor of the tray itself. As shown in FIG. 2C, part of the surface area of tray 1 includes rectangular slots 50 that accommodate the rectangular shape of jetons 102. In other words, the positions of the windows and the sensor strips 7 in the horizontal plane must conform to the layout of tray 1.

Figure 3B:
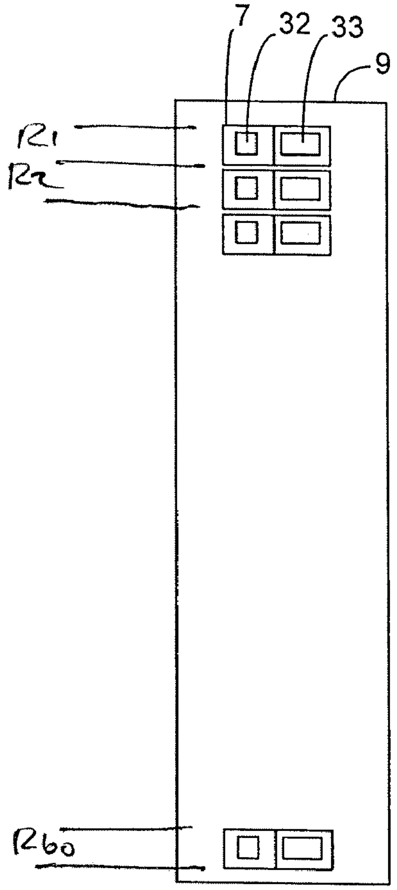
FIG. 3B is a top view of an optical sensor strip.
Figure 3A:
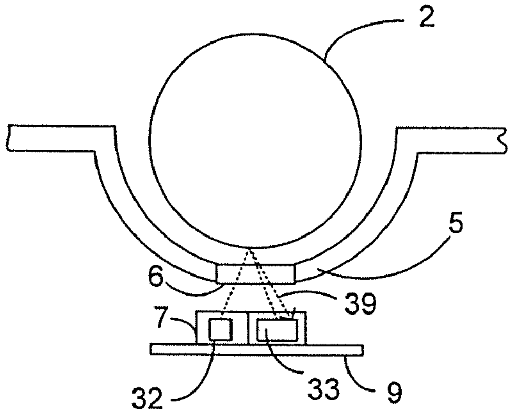
FIG. 3A is a cross section of an optical sensor strip.
Figure 3C:
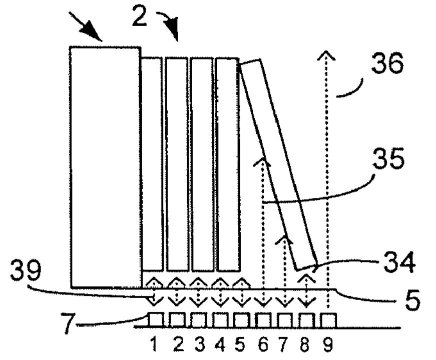
FIG. 3C is a side view of an optical sensor strip.

As embodied herein and depicted in FIGS. 3A-C, details views of the optical array controller and strip sensors are disclosed. Referring to FIG. 3A, a plan view of a portion of the optical array controller is shown. In particular, the portion shows the layout of the sensor strips 7 within a single column of tray 1 (E.g., See C5 in FIG. 1). Each sensor strip 7 is disposed in a column in a position corresponding to a row (E.g., R1-R60) and includes a sensor module having at least one diode emitter 32 and at least one diode detector 33. The sensor array disposed on circuit card assembly A, i.e., optical array controller 9, is controlled by the optical sensor controller 10 via bus 1200 (See FIG. 1). Bus 1200 provides the timing and control signals necessary to transmit and receive optical interrogation signals, and transfer the resultant chip detection data.

It will be apparent to those of ordinary skill in the pertinent art that modifications and variations can be made to diode emitter 32 of the present invention depending on cost, operating environment and other such factors. In one non-limiting example, diode emitter 32 may operate in the "near" IR wavelengths. However, diode emitter 32 may operate at or other wavelengths such as UV when economically feasible. The diode detector 33 may be of any suitable type and be implemented using a semiconductor photo transistor detector or other any other suitable device depending on cost and availability. Those of ordinary skill in the art will also understand that although one diode emitter 32 and one detector 33 are shown per sensor strip 7, each strip maybe include more than one diode emitter 32 and/or more than one diode detector 33. In one embodiment of the present invention, the sensor assembly may be implemented using a device commonly known as a "Sharp GP2S60 optical sensor, available from Sharp Microelectronics. The diode emitter 32 and detector 33 sensor groups may be assembled on a printed circuit board, as shown in FIG. 3A (only four are shown for convenience).

Referring to FIG. 3B, a detailed cross-sectional view of one sensor pair is disclosed. As shown herein, diode emitter 32 focuses a narrow signal beam (e.g., an infrared beam) through the window 6 disposed at the bottom of the arcuate portion 5 of tray 1. The beam is diffusely reflected by the edge of the chip 2. The distance from the chip edge to diode detector 33 should be relatively small. In one embodiment the distance is less than about 1.0 mm. In another embodiment, the distance is approximately 0.7 mm. The optical beam may be an ON-OFF modulated signal transmitting at a convenient frequency. Depending on the embodiment, the modulation frequency may be selected from a range between 10 KHz and 200 KHz. Return signals in the frequency range provided herein may be more easily distinguished from background radiation emitted by ambient light sources, such as fluorescent light sources or halogen light sources. In any event, the diode detector 33 is configured to sense the reflected optical signal and filter out ambient noise, with a filter matched to the modulating frequency of transmitter 32, to thereby detect the presence of a chip 2.

In another embodiment of the present invention, window 6 may be implemented using an optical material configured to pass wavelengths corresponding to detector 33 and filter unwanted wavelengths outside the passband to thereby improve the performance of the detector 33. For example, if detector 33 is operating in the near IR range, window 6 may be implemented with a filter configured to pass wavelengths in the near IR region of the spectrum.

Referring to FIG. 3C, a side view of an optical sensor strip is shown. In one embodiment, each sensor group (i.e., a diode emitter 32 and detector 33) may be spaced an adjacent sensor group in accordance with the pitch of the chips 2 such that there is one sensor group (i.e., a diode emitter 32 and detector 33) associated with each chip 2 position in the tray 1. In an ideal situation, where all the chips 2 are substantially perpendicular to the bottom of the arcuate portion 5, the reflected signal is returned by the edge of the chip 2. On the other hand, in the event of a chip 2 leaning in the tray 1, such as shown in FIG. 3C, the return signal levels 34, 35 and 36 received by some of the diode detectors 33 are lower than in the case of a direct edge reflection. This may be overcome and leaning chips may be detected by monitoring groups of signals.

In one embodiment of the present invention, a processor associated with the sensor strip 7 is programmed to perform an algorithm for correctly counting chips based the relative reflection levels. In an alternate embodiment, the chip reflection levels may be compared in an electronic circuit against an adaptively set threshold and accepted if at a certain level.

In yet another alternate embodiment, a comparison of the transmit and receive duty cycles may be used to detect a leaning chip. When the emitter diode is ON-OFF modulated with a 50% duty cycle, a perfectly aligned chip will provide a reflected signal that has an almost identical duty cycle. However, when a chip is tilted relative to the normal, or laterally not sitting centered in the beam, the return level is reduced somewhat. The combination of the effect of the reduced return signal and the effect of rise time of the photo-detector will result in a detected signal having a duty cycle with a greater period. The periodic variations may be used by the processor to detect a leaning chip, or warn the operator that a chip is not properly disposed in the tray 1.

Figure 4A:
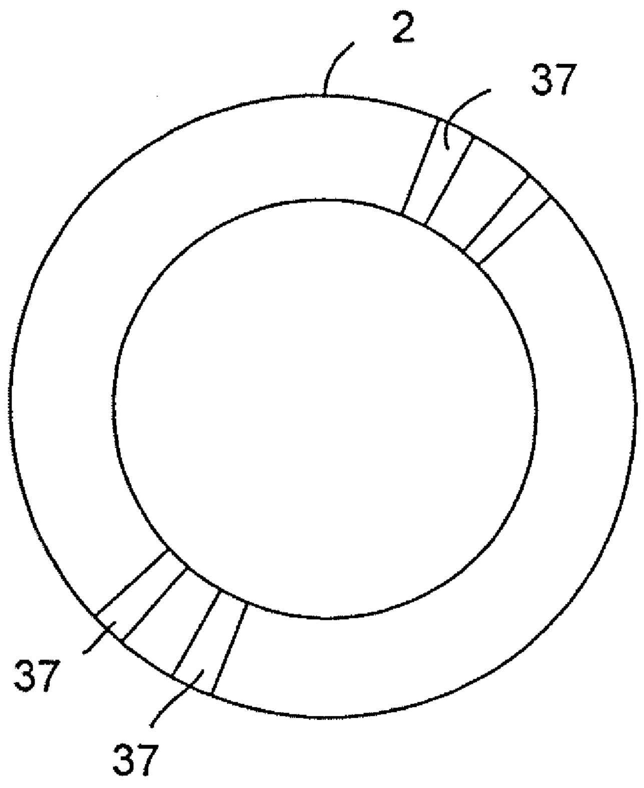
FIG. 4A is a top view of a gaming chip.

Referring to FIG. 4A, a top view of a gaming chip for use with the present invention is disclosed. Chips 2 are typically supplied in a variety of body colors and have various graphic images and indicia on their face surfaces and edges to discourage counterfeiting and identify the issuing casino. For example, gaming chip 2 may included color wedges 37 that are molded into the surface of the gaming chip for identification purposes. Unfortunately, certain colors may not be appropriate for certain sensor groups based on the wavelength user. For example, a chip having black markings on it may not be easily detected because black may absorb infrared in the wavelength used by certain diode emitter 32 and detector 33 sensor groups. In fact, chips having a certain arrangement of black markings is a quasi-standard for a $100 chip in North America.

Figure 4B:
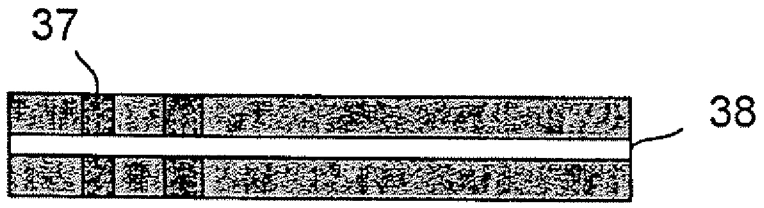
FIG. 4B is a side view of a gaming chip.

Referring to FIG. 4B, there is shown a chip 2 with a white "molded in" ring 38 of approximately ⅓ the thickness of the chip 2. This is of sufficient thickness to be reliably detected by the diode emitter 32 and detector 33 sensor groups. Other chip 2 body colors may be detected and do not require the issuing of an improved chip as disclosed above.

The present invention contemplates the use of a secure gaming chip that includes an HFID inlay having a programmable integrated circuit coupled to a propagation element embedded therein. The programmable integrated circuit may be programmed to include password and/or other authentication data, monetary values, etc. A suitable gaming chip must be stackable, i.e., be able to be read when stacked tightly in a column of up to 60 chips Reference is made to U.S. patent application Ser. No. 11/463,720, and WO/024171 which is incorporated herein by reference as though fully set forth in its entirety, for a more detailed explanation of a gaming chips that is suitable for use with the present invention.

Figure 5A:
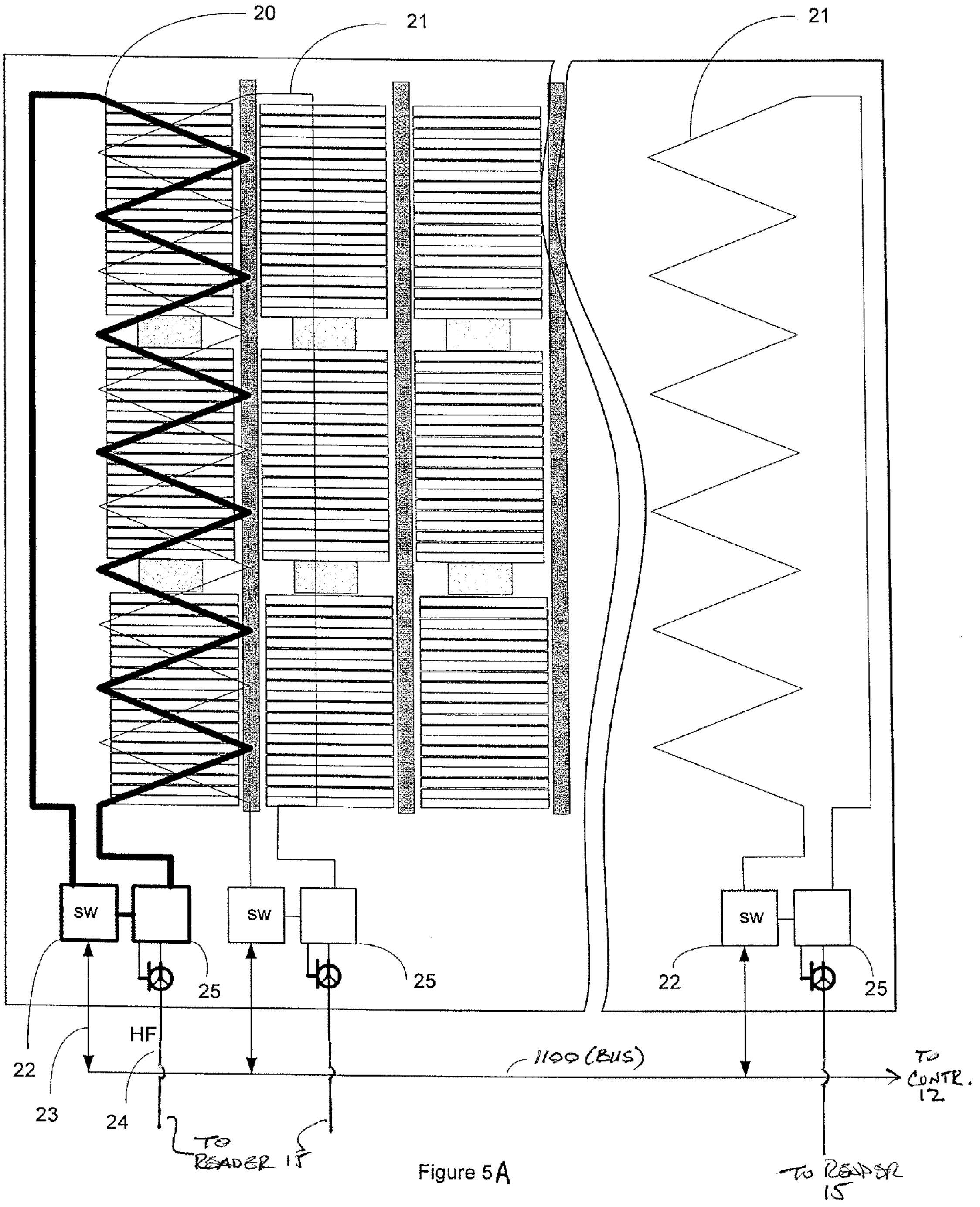
FIG. 5A is a schematic view of a coupler board.

As embodied herein and depicted in FIG. 5A, a schematic view of a coupler board 11 in accordance with one embodiment of the present invention is disclosed. In this view, two circuit boards containing the HF RFID couplers 11 and the coupler array controller 12 are disposed underneath the chips in tray 1, in the sensor cradle 4. The HF RFID coupler 11 under the left most chip column includes a left detector loop 20 and a right detector loop 21. Each loop (20, 21) is coupled to a multiplexer 22 and an impedance matching coupler 25. The impedance matching coupler 25 is coupled to HF RFID reader 15 by way of signal path 24. The multiplexers 22 are connected to the array controller bus 1100 by way of connections 23. This configuration is optimized to read only the IDs of chips in a single or double column. The saw tooth conductor pattern maximizes the magnetic field component intersecting the plane of each chip.

In operation, the Coupler Array Controller 12 is programmed to signal the multiplexers 22 to activate loops 21 and 22 in accordance with system timing. An HF signal is directed into impedance matching coupler 25 and is subsequently transmitted to reader 15 via signal path 24. The HFID Reader 15 reads the identifiers in each chip 2, and generates an inventory list of the chip 2 identification data detected in each column. Referring back to FIG. 1, Coupler Array controller 12 is connected to the optical sensor controller 13. Thus, the chip count data obtained by the diode emitter 32 and detector 33 sensor groups and by the HFID reader 15 is reconciled.

Figure 5B:
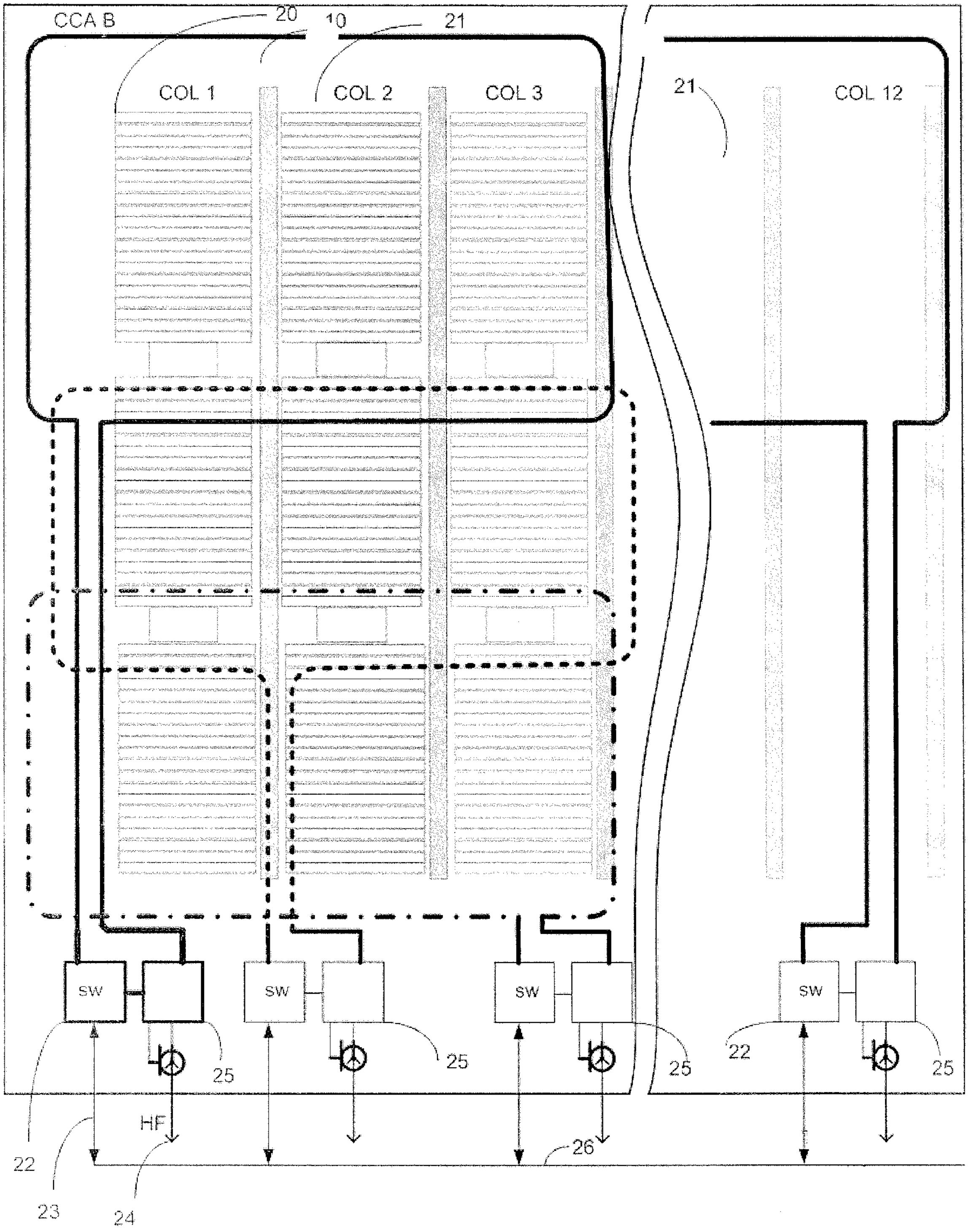
FIG. 5B is a schematic view of an alternate coupler board.

Referring to FIG. 5B, a schematic view of an alternate coupler board is disclosed. In this embodiment, the loop pattern disposed on the multilayer board 11 is configured to read chips 2 in horizontal row-by-row groupings as opposed to the column-by-column scheme provided in FIG. 5A. In this embodiment, the loops are oriented horizontally and overlap for complete tray coverage. In yet another embodiment, the loops are oriented at a 45 degree angle to improve the HF signal level received by the chips.

In operation it is desired to read the HF RFID chips as quickly as possible. The optical sensors are extremely fast with a complete tray being sensed in under 0.5 seconds. The cycle time for the HF RFID couplers are on the order of a few seconds. Since the anti-collision algorithm for ISO 15693 standard reduces scanning speed as the number of chips in the field increases, this embodiment of the present invention employs six (6) switched loops to provide complete coverage of a 720 chip tray (i.e., 60 rows of 12 columns) so that, in the worst case, only 120 chips will have to be resolved for each HF RFID scan.

To further improve the tray "read" time, the results of the optical scan are processed to determine: if there is a change in the number of chips detected; and what areas of the tray actually contain chips. The loops corresponding to empty areas are not read. Only those loops that actually include chips are read.

In the present invention, care has been taken to ensure that the HF RFID reader components and coupler loops do not interfere with the distance measurement sensors. Further, the system is configured such that tray 1 is readily accessible for easy use by the dealer. Of course, this precludes the use of "tunnel readers" frequently used in conventional RFID readers.

Figure 6A:
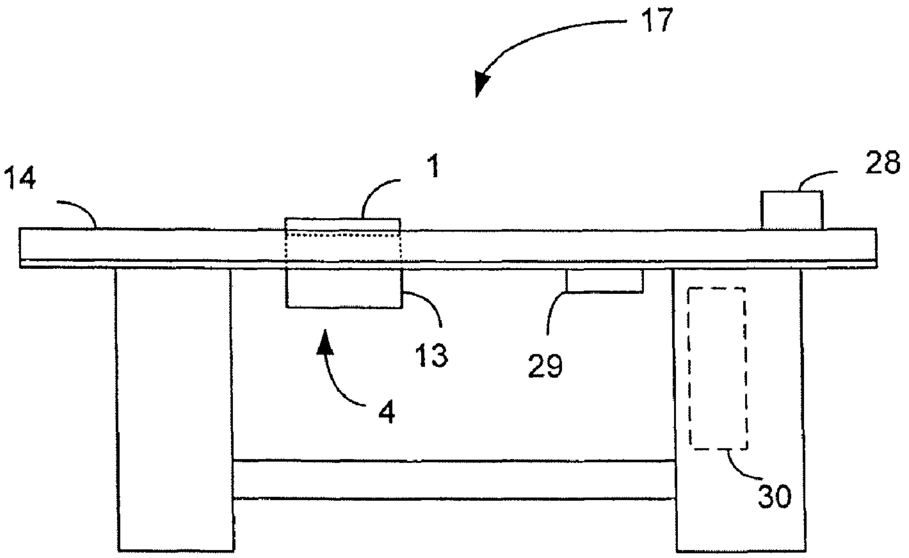
FIG. 6A is a side view of a gaming table.

Referring to FIG. 6A, a side view of a gaming table is shown. Note that the sensor cradle unit 4, as depicted in FIG. 1, may be integrated, for example, into a card gaming table 14 having a dealer shoe 28 and cash "drop box" 29. In an alternative embodiment, the HF RFID reader 15 and power supply 16 may be located in a central housing 30 and function as shared resources that are used by multiple sensor cradle units 4.

Figure 6B:
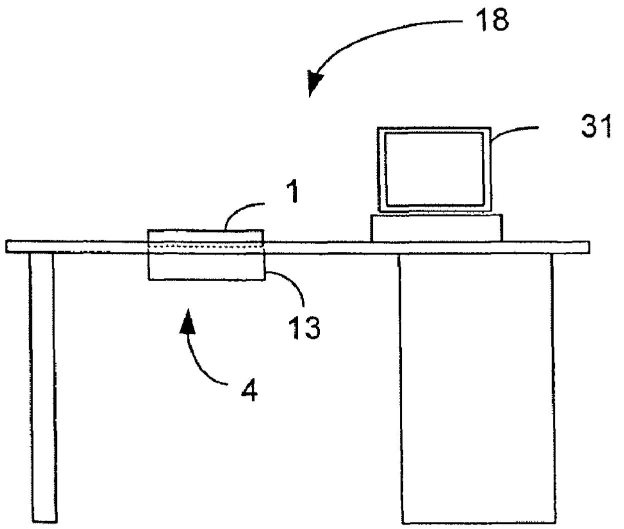
FIG. 6B is a side view of a pit workstation.

Referring to FIG. 6B, a side view of a pit workstation is shown. In this alternate embodiment, the sensor cradle unit 4 is integrated in a stand alone Counting Station 18 equipped with a computer 31. Computer 31 may be coupled to a database or other software such as accounting software, for use at the pit boss work station or in the vault.

The sensor cradle 4 may be integrated into any gaming table where HF RFID gaming chips 2 are used, including but not limited to Black Jack, Roulette table, etc.

The equipment and methods disclosed herein can be adapted to other situations where it is possible to position optical sensors closely adjacent to the object or multiple objects whose presence and ID must be determined and where a few inches of space is available to install the HF RFID coupling coils. Examples include but not limited to: perfume bottles on retail display shelves; wine bottles; test tubes or other biological sample holders in racks, jewelry or diamonds in bags or on holders, chess pieces on a board, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system for counting and identifying a plurality of gaming chips having a programmable RFID device embedded therein, the programmable RFID device having unique authentication data disposed therein, the system comprising:

a tray structure defining a plurality of predetermined chip positions within a multi-dimensional grid, the tray structure being configured to carry the plurality of gaming chips such that each of the plurality of gaming chips are substantially disposed in a corresponding one of the plurality of predetermined chip positions within the multi-dimensional grid;

an optical sensing assembly configured to optically scan each of the plurality of predetermined chip positions to detect the presence of a gaming chip in each of the plurality of predetermined chip positions if present therein and generate a count corresponding to a number of detected gaming chips; and an RFID reader assembly configured to interrogate the plurality of gaming chips disposed in the tray structure and generate a list of authenticated gaming chips, the RFID reader assembly further generating a system status based on a comparison of the list of authenticated gaming chips relative to the number of detected gaming chips counted by the optical sensing assembly.

2. The system of claim 1, wherein the tray structure is configured to accommodate twelve rows of gaming chips therein.

3. The system of claim 2, wherein the tray structure is configured to accommodate 60 rows of gaming chips per column.

4. The system of claim 1, wherein the tray structure is configured to accommodate American style gaming chips, European style jeton gaming chips and/or rectangular plaques.

5. The system of claim 1, wherein each of the plurality of predetermined chip positions within the tray structure further comprises:

a slot having a shape and size conforming to a gaming chip disposed on its parametric edge;

a window disposed in the slot and configured to abut at least a portion of the perimetric edge of the gaming chip; and an optical sensor configured to direct a first optical signal to the portion of the perimetric edge and detect a second optical signal diffusely reflected from a surface of the perimetric edge, the optical sensor being disposed approximately 1.0 mm from the perimetric edge of the gaming chip.

6. The system of claim 5, wherein the slot is arcuate and the perimetric edge of the gaming chip is substantially circular.

7. The system of claim 5, wherein the optical sensor further comprises an optical emitter and a diode detector working in tandem.

8. The system of claim 7, wherein the optical emitter operates at a center frequency in near infrared wavelengths.

9. The system of claim 7, wherein the optical emitter is comprised of an emitter diode or a phototransistor.

10. The system of claim 5, wherein the window includes an optical filter substantially matched to an operating wavelength of the optical sensor.

11. The system of claim 9, wherein the optical filter is configured to pass infrared light.

12. The system of claim 5, wherein the optical sensor is disposed approximately 0.7 mm from the perimetric edge of the gaming chip.

13. The system of claim 5, wherein the optical sensor operates in a frequency range between approximately 10 KHz and 200 KHz.

14. The system of claim 5, wherein the optical sensor employs ON-OFF modulation.

15. The system of claim 1, wherein the optical sensing assembly further comprises:

a plurality of optical sensors disposed within the multi-dimensional grid, each of the plurality of optical sensors being disposed proximate to a corresponding one of the plurality of predetermined chip positions, each optical sensor being configured to direct a first optical signal to at least a portion of a perimetric edge of a gaming chip and detect a second optical signal diffusely reflected from a surface of the perimetric edge, the optical sensor being disposed approximately less than or equal to 1.0 mm from the perimetric edge of the gaming chip; and an optical sensing assembly processor coupled to the plurality of optical sensors, the processor being configured to sequentially scan the plurality of optical sensors within a predetermined period of time, the processor being programmed to determine that a gaming chip is present in a corresponding one of the plurality of predetermined chip positions if an optical sensor detects the second optical signal or determine that a gaming chip is not present in the corresponding one of the plurality of predetermined chip positions if the second optical signal is not detected.

16. The system of claim 15, wherein the optical sensing assembly processor is programmed to generate the count corresponding to the number of detected gaming chips by summing the number of gaming chips determined to be present.

17. The system of claim 16, wherein the predetermined period of time is less than approximately 0.5 seconds.

18. The system of claim 15, wherein each of the plurality of predetermined chip positions within the tray structure includes a slot having a shape and size conforming to a gaming chip disposed on its parametric edge.

19. The system of claim 18, wherein the slot is arcuate and the perimetric edge of the gaming chip is substantially circular, and/or the slot is rectangular and the perimetric edge of the gaming chip is substantially rectangular.

20. The system of claim 18, further comprising a window disposed in each slot, the window being configured to abut at least a portion of the perimetric edge of the gaming chip.

21. The system of claim 20, wherein the optical sensor further comprises a diode emitter and a diode detector in optical communication with the perimetric edge via the window.

22. The system of claim 1, wherein the RFID reader assembly further comprises:

a HF RFID coupler array disposed proximate the tray structure, the HF RFID coupler assembly including a plurality of coupler loops configured to perform an HF scan of the plurality of gaming chips within the multi-dimensional grid, the HF scan providing HF authentication signals;

an HF RFID reader coupled to the HF RFID coupler array, the HF RFID reader being configured to derive authentication data from the HF authentication signals for each gaming chip disposed in the tray structure; and a controller coupled to the HF RFID coupler array and the HFID reader, the controller being configured to generate the list of authenticated gaming chips from the authentication data.

23. The system of claim 22, wherein the controller is programmed to:

count the authenticated gaming chips to determine an authenticated number of gaming chips in the tray structure;

receive the count from the optical sensing assembly; and compare the count from the optical sensing assembly to the authenticated number to derive the system status.

24. The system of claim 23, wherein the system status indicates a presence of a non-authenticated gaming chip if the count from the optical sensing assembly is greater than the authenticated number.

25. The system of claim 23, wherein the system status indicates an improperly seated gaming chip if the count from the optical sensing assembly is less than the authenticated number.

26. The system of claim 22, wherein the controller retrieves a monetary value for each of the gaming chips in the list of authenticated gaming chips and calculates a total value for all of the gaming chips disposed in the tray structure.

27. The system of claim 26, wherein the controller retrieves the monetary value from a database.

28. The system of claim 27, wherein the database is resident on a remote host computer, a local host computer or on a data structure coupled to the controller.

29. The system of claim 28, wherein the data structure is a flash drive.

30. The system of claim 22, wherein the controller is configured to provide the HF RFID coupler array with timing signals to thereby control the sequence of the HF scan.

31. The system of claim 22, wherein the tray structure accommodates a plurality of columns of gaming chips, and wherein the plurality of coupler loops includes at least one RFID loop configuration for each of the plurality of columns.

32. The system of claim 31, wherein the at least one RFID loop configuration includes a left hand loop configuration and a right hand loop configuration for each of the plurality of columns.

33. The system of claim 31, wherein the at least one RFID loop configuration is configured in a saw-tooth pattern such that only gaming chips disposed in a single column are sensed.

34. The system of claim 22, wherein the plurality of coupler loops includes a plurality of overlapping RFID loop configuration to sense the gaming chips disposed in the tray structure.

35. The system of claim 22, wherein each of the plurality of coupler loops is coupled to a switch actuated by the controller, the controller actuating the each of the switches in a predetermined sequence to prevent detuning of adjacent coupler loops.

36. The system of claim 22, wherein the controller is coupled to the optical sensing assembly, the optical sensing assembly providing a location of empty portions of the tray structure, the controller being programmed to direct coupler loops corresponding to the empty portions not to perform the HF scan.

37. The system of claim 22, wherein the controller is coupled to the optical sensing assembly, the controller being programmed to direct the HF RFID coupler array not to perform the HF scan unless the optical sensing assembly detects a change in the count corresponding to the number of detected gaming chips.

38. The system of claim 1, wherein the system is further configured to provide a warning when the count of authenticated objects is different from the number of detected objects counted by the optical sensing assembly.

39. A system for identifying a plurality of objects in close proximity, each of the plurality of objects having a programmable RFID device embedded therein, the programmable RFID device having unique authentication data disposed therein, the system comprising:

a structure defining a plurality of predetermined spatial positions, the structure being configured to support the plurality of objects, each of the plurality of objects being disposed in corresponding one of the plurality of predetermined spatial positions;

an optical sensing assembly configured to optically scan each of the plurality of predetermined spatial positions to thereby detect the presence of an object in each of the plurality of predetermined spatial positions if present therein and generate a list of optically detected objects; and an RFID reader assembly configured to interrogate the plurality of objects disposed in the structure and generate a list of authenticated objects, the RFID reader assembly further generating a system status based on a comparison of the list and count of authenticated objects relative to the number of detected objects counted by the optical sensing assembly.

40. The system of claim 39, wherein the structure is a tray and the objects are gaming chips.

41. A system for counting and identifying a plurality of gaming chips having a programmable RFID device embedded therein, the programmable RFID device having unique authentication data disposed therein, the system comprising:

a tray structure defining a plurality of predetermined chip positions within a multi-dimensional grid, the tray structure being configured to carry the plurality of gaming chips such that each of the plurality of gaming chips are substantially disposed in a corresponding one of the plurality of predetermined chip positions within the multi-dimensional grid, the plurality of gaming chips including American style gaming chips, European style jetons, and/or rectangular European style plaques;

an optical sensing assembly configured to optically scan each of the plurality of predetermined chip positions to detect the presence of a gaming chip in each of the plurality of predetermined chip positions if present therein and generate a count corresponding to a number of detected gaming chips; and an RFID reader assembly configured to interrogate the plurality of gaming chips disposed in the tray structure and generate a list of authenticated gaming chips, the RFID reader assembly further generating a system status based on a comparison of the list of authenticated gaming chips relative to the number of detected gaming chips counted by the optical sensing assembly.

* * * * *